April 15, 1924.  1,490,263

E. A. GALLUP

FRUIT GATHERER

Filed June 21, 1922

Inventor
E. A. Gallup
By Philip A. H. Serell
Attorney

Patented Apr. 15, 1924.

1,490,263

UNITED STATES PATENT OFFICE.

ELIJAH A. GALLUP, OF OMAHA, NEBRASKA.

FRUIT GATHERER.

Application filed June 21, 1922. Serial No. 569,871.

*To all whom it may concern:*

Be it known that ELIJAH A. GALLUP, a citizen of the United States, residing at Omaha, in the county of Douglas and State of Nebraska, has invented certain new and useful Improvements in Fruit Gatherers, of which the following is a specification.

The invention relates to fruit gatherers and has for its object to provide a device of this character comprising a pivoted frame carried by a hexagon shaped handle and provided with a fruit receiving bag, and to provide in combination with the pivoted frame spring members whereby the frame is normally held in open position for the reception of a piece of fruit.

A further object is to provide the bottom of the bag with an extension preferably formed from fabric and adapted to be held in contact with the handle, by the hand of the operator, when the bag is being dumped.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
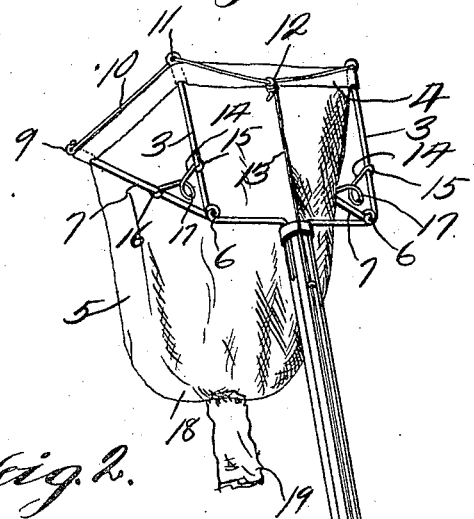
Figure 1 is a perspective view of the fruit gatherer.
Figure 2:
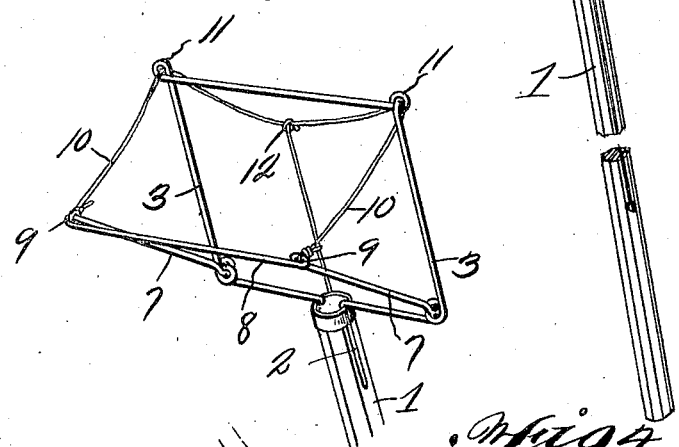
Figure 2 is a perspective view of the fruit gatherer frame, the springs being eliminated.
Figures 3, 4:
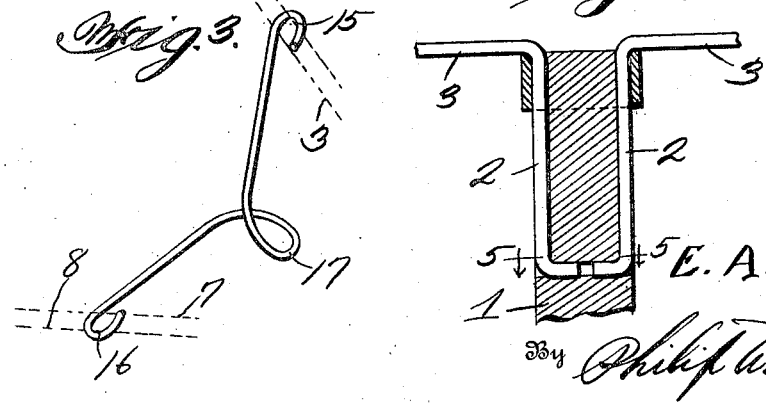
Figure 3 is a perspective view of one of the springs.
Figure 4 is a vertical sectional view through the upper end of the handle member.
Figure 6:
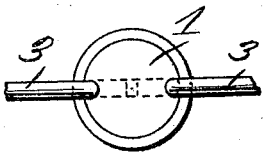
Figure 6 is a top plan view of the handle member.
Figure 5:
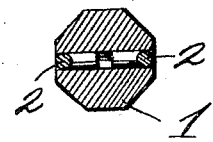
Figure 5 is a horizontal sectional view through the handle taken on line 5—5 of Figure 4.

Referring to the drawing, the numeral 1 designates the handle member, which member is preferably hexagon shaped as shown, however it is to be understood that it can be any shape desired but preferably not round so that the handle cannot rotate in the hand of the operator during a fruit gathering operation. Secured to the upper end of the handle 1 by the arms 2 of L-shaped brackets 3, which brackets form a stationary frame of the same plane as the handle 1 for holding the rear side 4 of the fruit receiving bag 5 as clearly shown in Figure 1. The L-shaped members 3 are provided with eyes 6, to which are pivotally connected the arms 7 of the movable bag frame 8, which frame has secured thereto the forward side of the bag 5. Secured to eyes 9 of the frame 8 are cords 10, which cords extend rearwardly through eyes 11 of the members 3, and have secured thereto at 12 a downwardly extending bag controlling cord 13, which the operator grasps for closing the frame 8 and grasping a piece of fruit and breaking the same from the tree so that it will drop into the bag 5. The above structure is substantially the same as the structure shown in the patent to Elijah A. Gallup No. 792,018, issued June 13, 1905. It has been found that considerable difficulty is experienced in making the frame 8 move outwardly positively after a pulling operation, and it has also been found that during the dumping of a bag the operation is materially facilitated by providing means whereby the operator may easily and quickly grasp and hold the bottom of the bag 5. To insure the positive opening of the frame 8, springs 14 are provided, which springs are connected at 15 to the members 3 and at 16 to the arms 7 of the frame 8, said springs being formed from a single piece of spring wire and provided with loops 17 for insuring a greater range of flexibility. It will be seen that when the operator closes the frame 8 and consequently the mouth of the bag 5, said springs 14, will, upon releasing the frame 8, insure the positive outward movement of the frame 8.

The lower end 18 of the bag 5 is provided with an extension 19 preferably of canvas or other material from which the bag 5 is formed. When the operator desires to dump the contents of the bag, he grasps the extension 19, and holds the same against the adjacent side of the handle member 1, after which the contents of the bag will easily and quickly roll out of the bag when the bag is inverted.

From the above it will be seen that means is provided in combination with pivoted frames of a fruit gathering device, whereby said frames will positively open and also that means is provided for holding the bottom of the bag during the dumping operation and that the angular shaped handle prevents rotation of the device in the hand while in operation.

The invention having been set forth what is claimed as new and useful is:—

A fruit gatherer comprising a handle member, a frame carried by said handle member, an auxiliary frame pivotally connected to the lower end of the handle carried frame, a fruit receiving bag having its mouth connected to the upper ends of the frames, means for closing said frames, looped springs having their ends connected to the sides of the handle carried frame and the adjacent sides of the pivoted frame and forming means for forcing said frames away from each other, said springs being disposed between the adjacent sides of said frames.

In testimony whereof I affix my signature.

ELIJAH A. GALLUP.